United States Patent [19]

Rasmussen

[11] Patent Number: 5,447,119
[45] Date of Patent: Sep. 5, 1995

[54] FEEDING DEVICE

[76] Inventor: Hans Rasmussen, Assenbjergvej 3, Braade, Nykoebing, Denmark

[21] Appl. No.: 256,276
[22] PCT Filed: Aug. 1, 1993
[86] PCT No.: PCT/DK93/00008
  § 371 Date: Aug. 22, 1994
  § 102(e) Date: Aug. 22, 1994
[87] PCT Pub. No.: WO93/13652
  PCT Pub. Date: Jul. 22, 1993

[30] Foreign Application Priority Data
  Jan. 8, 1992 [DK] Denmark ............................ 0025/92

[51] Int. Cl.⁶ .................................................. A01K 5/00
[52] U.S. Cl. ...................................... 119/51.5; 119/53.5
[58] Field of Search ...................... 119/51.5, 53, 53.5, 119/54; 222/166, 200

[56] References Cited

U.S. PATENT DOCUMENTS

| | | | |
|---|---|---|---|
| 484,442 | 10/1892 | Magoon | 119/53.5 |
| 2,503,886 | 4/1950 | Olson | 119/544 |
| 2,644,425 | 7/1953 | Hazen . | |
| 4,947,798 | 8/1990 | De Wispelaere | 119/53 |
| 5,243,930 | 9/1993 | Rahm | 119/54 |

FOREIGN PATENT DOCUMENTS

| | | | |
|---|---|---|---|
| 7527 | 5/1905 | Denmark . | |
| 0206636 | 12/1986 | European Pat. Off. . | |
| 2660155 | 10/1991 | France . | |
| 2750163 | 5/1979 | German Dem. Rep. | 119/54 |
| 293106 | 7/1916 | Germany | 119/54 |
| 2652788 | 8/1984 | Germany . | |

Primary Examiner—Todd E. Manahan
Attorney, Agent, or Firm—Watson, Cole, Grindle & Watson

[57] ABSTRACT

A feeding device for feeding animals, such as pigs or hogs, includes a tubular feed reservoir (16) and a feed discharge tube 27 having a feed discharge opening at its lower end (17) above a base member (10) defining a feed support surface (12). Troughs (11) may be arranged adjacent to the feed support surface (12), and the bottom surfaces (13) of the troughs are located on a lower level than the feed support surface (12). The feed reservoir (16) is suspended at its upper part in a pendulum-like manner and transverse movement of the reservoir is restricted by an encircling ring member (18). Animals being fed may push the lower end of the feed discharge tube (27) so that the lower end thereof is moved transversely. The lower length (31) of the feed discharge tube (27) is elastically flexible such that it may be flexed by larger pigs or animals, whereby the lower end of the feed discharge tube (27) may be moved further relative to the base member (10). Thus, the discharge rate of feed adapts itself to the size of the animals being fed.

12 Claims, 2 Drawing Sheets

FEEDING DEVICE

BACKGROUND OF THE INVENTION

1. Field of the Invention

The present invention relates to a feeding device for feeding animals, such as pigs or hogs, which includes a feed reservoir from which feed is supplied to a base member defining a feed support surface or trough surface substantially exclusively under the influence of gravity.

2. The Prior Art

U.S. Pat. No. 2,644,425 discloses a feeding device or feeding apparatus of this type for feeding ground mixture to swine or hogs. In this known ground mixture feeder the feed reservoir is rotatably mounted in relation to the circular pan defining an annular trough therein. Radial projections fastened to the lower end of the reservoir are located within the annular trough so that the hogs when feeding will snout the projections back and forth and thereby turn the reservoir back and forth. Thereby stopping and clogging of the feed will be prevented and the flow of feed from the reservoir into the trough may be accelerated.

DE-C2-26 52 788 discloses a more simple and steady feeding device in which feed under the influence of gravity may flow from a feed reservoir and a feed discharge tube depending therefrom to a feed support surface of a trough. The feed discharge tube, which is stiff, is connected to the lower part of the funnel-shaped feed reservoir, which is made from an easily deformable material so that the depending feed discharge tube may be moved in transverse directions. The open lower end of the feed discharge tube is closely spaced from the feed support surface of the trough, and an intermediate part of the feed discharge opening is surrounded by an annular member having an inner diameter exceeding the outer diameter of the feed discharge tube whereby the clearance between the annular member and the outer surface of the feed discharge tube allow for a certain transverse movement of the feed discharge tube. The animals being fed by means of the feeding device may push and easily displace the lower end of the feed discharge tube and thereby accelerate the delivery rate of feed to the feed support surface. The vertical position of the movement restricting annular member may be adjusted to adjust the apparatus to the size of the animals being fed. However, as the lower part of the feed reservoir is made from an easily deformable material so that the feed discharge tube may to some extent be displaced axially upwardly, the known feeding device is in practice suited for feeding piglets only.

The present invention provides feeding device of the type just described which may be used for feeding animals of different size with a minimum of adjustments being necessary.

SUMMARY OF THE INVENTION

Thus, the present invention provides a feeding device for feeding animals, such as pigs or hogs, the device including a base member defining a feed support surface, a feed reservoir, a feed discharge tube communicating with the reservoir and extending downwardly therefrom, the lower end of the feed discharge tube, which is positioned above and closely spaced from the feed support surface, defining a feed discharge opening located opposite to the feed support surface, the feed discharge tube being moveable relative to the base member and transversely to the longitudinal axis of the discharge tube by the animals being fed, and restriction means for cooperating with the feed discharge tube at a position above the feet support surface so as to restrict transverse movement of the feed discharge tube to a predetermined value at the position from which a lower length of the feed discharge tube depends, so as to allow an initial transverse movement of the lower end of the discharge tube in relation to the base member. The feeding device according to the invention is characterized in that the lower length of the feed discharge tube is elastically flexible such that it may be flexed by at least some of the animals which may be fed by means of the feeding device, whereby due to a force being applied in a transverse direction the lower end of the feed discharge tube may be moved further relative to the base member.

The feed discharge tube is suspended so that it may rather easily be transversely moved within the limits provided by the restriction means. As an example, the upper part of the feed discharge tube or part of the feed reservoir may be made from an easily deformable material, or the feed reservoir and the feed discharge tube may be mounted so as to be moveable like a pendulum.

When animals are eating feed supplied through the space defined between the lower edge of the feed discharge tube and the opposite feed support surface, the animals will push the feed discharge tube in an attempt to get more feed. The force required to transversely move the discharge tube within the limits defined by the restriction means is preferably such that it may be provided by any of the animals for which the feeding device is designed. Such pushing forces will cause a pendulous or transverse movement of the lower end of the discharge tube, whereby an increased area of the feed support surface may be covered by feed flowing from the feed discharge opening, so that the supply of feed through the spacing may be accelerated. Furthermore, the transverse movements of the feed discharge tube counteract or prevent stopping and clogging of feed in the discharge tube or reservoir. Therefore, the feeding device may be used not only in connection with dry, ground corn, dry ground mixture, or pellets, but also in connection with less pourable particulate feed materials, such as ground corn in which fat has been absorbed in a molten condition.

When the animals, for example pigs or hogs, have grown to such a size that they are able not only to move the feed discharge tube transversely as described above, but also to flex or bend the lower length of the feed discharge tube, feed flowing through the discharge tube may be discharged over a further enlarged area of the feed support surface, whereby the feed supply rate may be increased to satisfy the growing animals' need of an increased amount of feed. This means that the need for currently adjusting the feeding apparatus to the growing animals being fed is substantially reduced or eliminated.

The flexibility of the lower length of the feed discharge tube should preferably be within certain limits. If the lower length of the feed discharge tube is relatively stiff, the increase in the feed supply rate which the bigger animals may obtain by flexing the lower length of the discharge tube is too small, and if the lower length of the discharge tube is too flexible, it may be too easy for the bigger animals to obtain extra feed so that they do not eat all of the feed discharged. It has been found that the flexibility of the lower length of the feed discharge tube is preferably such that a force of P kg applied to the lower free end of the feed discharge tube at right angles to the longitudinal axis thereof causes further movement of the free end in the range of 0.3 P–3 P mm in relation to the base member. More preferably, the range is 0.4 P–2 P mm or 0.5 P–1.5 P mm and most preferably approximately 1 P mm when the feeding device is used for feeding pigs.

The upper end of the feed discharge tube positioned above the restriction means may be relatively stiff, provided that the lower length of the discharge tube has the flexibility desired. The discharge tube may be an integral tube length or be composed by two or more tube sections. Furthermore, the feed discharge tube may be made from any material, such as metal. In the preferred embodiment, however, the feed discharge tube is made from a flexible plastic material, such as polyvinyl chloride (PVC). The feed discharge tube or part thereof is preferably made from a transparent material so that it is easy to check that the feed discharge tube is completely filled with feed so that the feeding device may operate properly.

The feed reservoir may be a container, such as a funnel-shaped container, having cross-sectional dimensions substantially exceeding the cross-sectional dimensions of the feed discharge tube. In the preferred embodiment, however, the feed reservoir as well as the feed discharge tube communicating therewith is in the form of an integral length of a cylindrical tube. In the latter case, the upper part of the integral tube length functions as feed reservoir while the lower part of the tube length serves as the feed discharge tube described above. Furthermore, the inherent flexibility of the upper part of the cylindrical tube may then more or less replace the pendulum suspension so that the upper end of the tube may be more or less rigidly moveable. Feed or fodder may continuously or intermittently be supplied into the upper end of the feed reservoir or the cylindrical tube by automatically operating supply means or by hand.

The feed support surface may, for example, be upwardly concave so as to form a trough, or the support surface may be a slanting, substantially plane surface. The lower edge portion of the feed discharge tube may have a shape which is substantially complementary to the shape of the opposite feed support surface so that the space defined between the lower end of the feed discharge tube and the feed support surface is substantially uniform along the periphery of the feed discharge tube. Alternatively, the lower edge of the feed discharge tube may have any other suitable shape. As an example, the lower edge of the discharge tube may have peripherally spaced incisions or cutouts formed therein. In the preferred embodiment, the feed support surface is a substantially plane, horizontally extending surface.

The spacing defined between the lower end portion of the feed discharge tube and the feed support surface should preferably be adjusted dependent on the type of feed used. As an example, the vertical spacing should normally not be less than 10 mm and preferably about 15 mm, when the feed is ground corn with fat absorbed therein. When the feed used is in the form of pellets the vertical spacing is preferably not less than twice the diameter of the pellets. The feeding device according to the invention preferably comprises means for adjusting the spacing of the lower end of the feed discharge tube from the feed support surface. Such means preferably comprise means for displacing the feed discharge tube axially. These adjusting means may also reduce the spacing to zero when the respective feeding place is not in use.

The feeding device according to the invention may further comprise at least one trough surface positioned immediately adjacent to and below the feed support surface. The pig or animal eating the feed supplied through the feed discharge tube may then push feed supplied to the feed support surface down onto the adjacent trough surface, and the animal may eat the feed from the trough surface when a suitable amount has been collected therein. Such pushing or rooting activity may satisfy the rooting instinct of pigs or swine, whereby the animals may be kept occupied and satisfied even when feed is supplied relatively slowly. A slow supply rate and the consequent slow eating rate improves the utilization of the feed.

In the presently preferred embodiment of the feeding device according to the invention a pair of trough surfaces are arranged on either side of the feed support surface, the feed discharge tube being arranged in a fence extending substantially along a vertical plane dividing the trough surfaces and the feed support surface into halves. A single feed discharge tube may then supply feed to four eating places arranged in two different enclosures or pigpens, which are separated by the fence. The feeding device may form part of a feeding system comprising two or more feeding devices to which feed is supplied by means of a common feed supply system.

The feeding device may further comprise means for feeding water or liquid feed to each trough surface. Such liquid feeding means may, for example, be of the type which may be operated by the animals, for example by means of a push button. When the feed supplied to the feed support surface is relatively dry, the animals are not able to eat much of the feed without liquid. Therefore, the animals are further prompted to push the feed down into the trough where water or liquid may be added. Because feed is not supplied unless the animals operate the device by pushing the feed discharge tube, the animals are not inclined to leave feed in the trough.

BRIEF DESCRIPTION OF THE DRAWINGS

The invention will now be further described with reference to the drawings, wherein.

DETAILED DESCRIPTION OF THE PREFERRED EMBODIMENT

Figure 1:
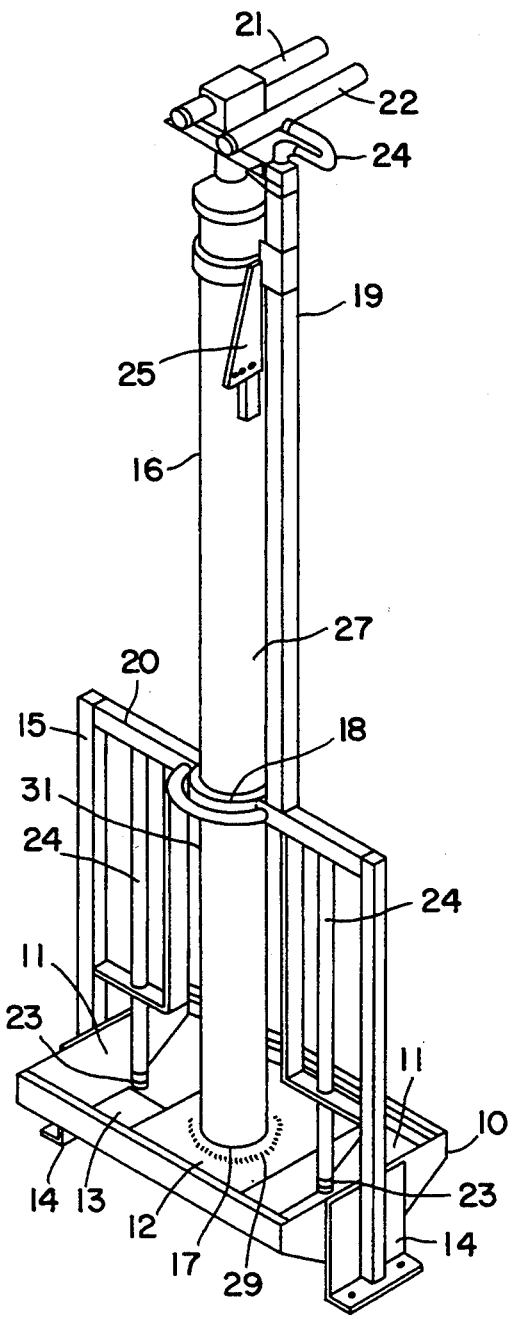
FIG. 1 is a perspective view of a first embodiment of the feeding device according to the invention.

The feeding device shown in FIG. 1 comprises a trough unit 10 which may, for example, be made from sheet metal, such as stainless steel. The trough unit 10 comprises a pair of troughs 11 positioned on either side of a raised portion defining an upper, substantially horizontally-extending feed support surface 12, which is positioned on a higher level than the bottom surfaces 13 of the troughs 11. A mounting bracket 14 is arranged on either end of the trough unit 10, and a fence section 15, which is also fastened to the trough unit 10 extends upwardly from the trough unit 10 and transversely to the troughs 11 substantially along a symmetry plane of the trough unit 10.

A tubular, vertically extending tube or feed reservoir 16, which is made from a flexible material, such as a transparent plastic material, for example polyvinyl chloride, is suspended at its upper end so that the tube 16 may move like a pendulum. Because of the inherent flexibility of the tube 16, a similar effect may be obtained when the upper end of the tube is more or less rigidly mounted. The lower edge portion 17 of the tubular reservoir 16 is spaced from the feed support surface 12. The tubular reservoir 16 is passed through a ring member 18 which is mounted on the fence section 15. The ring member 18 encircles the tubular reservoir 16 with a certain radial clearance allowing for a limited swinging movement of the tube or reservoir 16 as further explained below.

The upper part of the tubular reservoir 16 extends along a post member 19, which is fastened to and extends vertically upwardly from an upper rail 20 of the fence section 15. A feed discharge tube 21 opens into the upper end of the feed reservoir 16, and a liquid supply tube 22 is connected to a water or liquid nipple 23 arranged in each of the troughs 11 via connecting tubes 24, which extend through the post member 19 and the upper rail 20 of the fence section 15. A spacing adjusting mechanism 25 interconnecting the upper end of the tubular feed reservoir 16 and a stationary structural member, not shown, may be used for adjusting the spacing of the lower edge portion 17 of the tubular feed reservoir 16 above the feed support surface 12.

Figure 2:
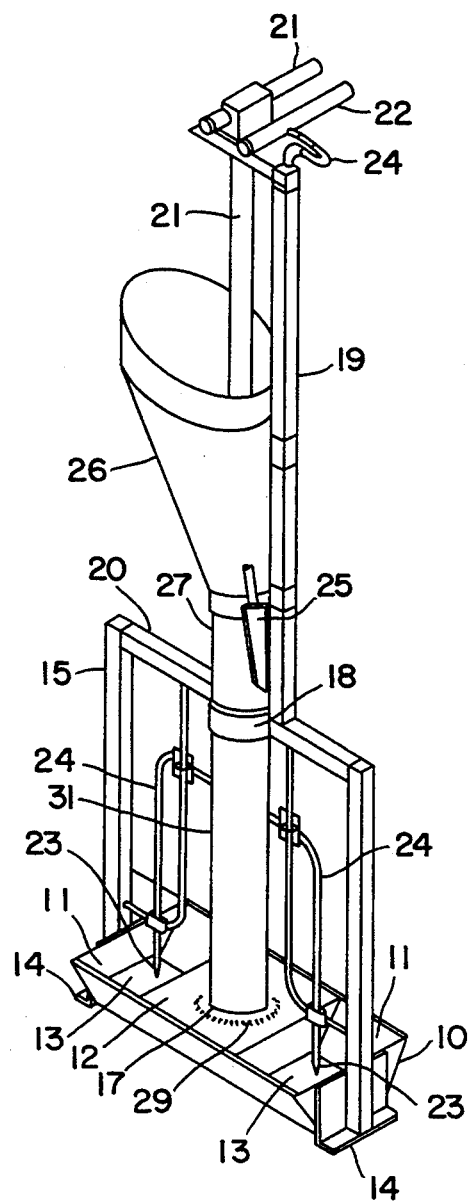
FIG. 2 is a perspective view of a second embodiment of the feeding device according to the invention.

The embodiment illustrated in FIG. 2 corresponds in many respects to that shown in FIG. 1 and similar parts are provided with the same reference numerals. In FIG. 2, the tubular feed reservoir 16 has been replaced by a funnel shaped feed reservoir 26 and a feed discharge tube 27 corresponding to the lower part of the reservoir tube 16 in FIG. 1.

The feeding devices shown in FIGS. 1 and 2 are adapted to be used as part of a fence separating two enclosures or pigpens. When the feeding device is out of operation the lower edge portion 17 of the feed discharge tube 27 may be moved into contact with the feed support surface 12 by means of the adjusting mechanism 25 so that no feed is exposed to the animals in the enclosures or pigpens. When the feeding device is to be used, the spacing is adjusted to a suitable value by means of the adjusting mechanism 25.

Figure 3:
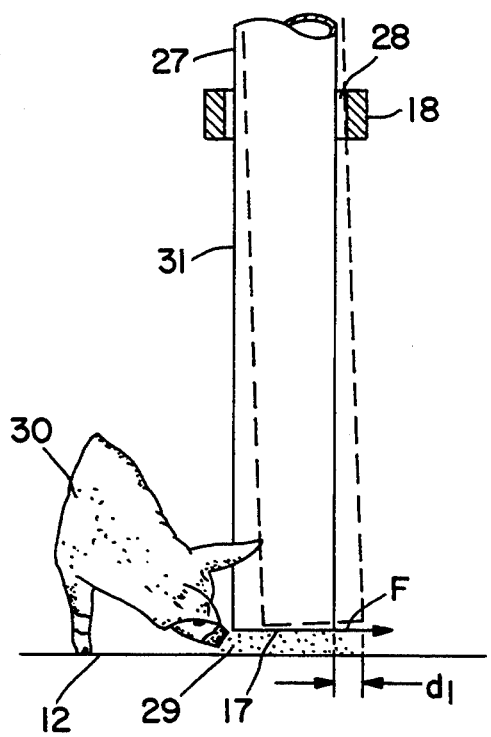
FIGS. 3 and 4 are side views diagrammatically illustrating the function of the lower flexible length of the feed discharge tube.
Figure 4:
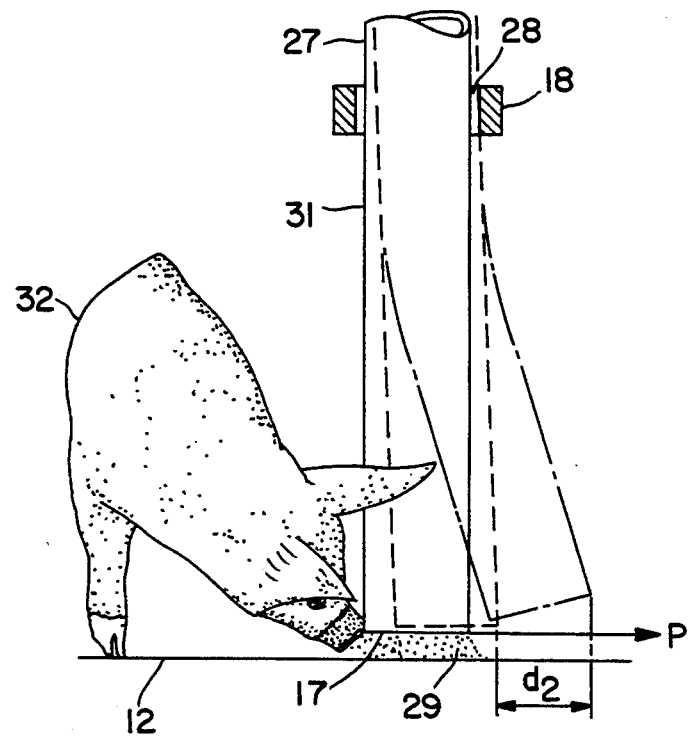

The operation of the feeding device according to the invention will now be explained with reference to FIGS. 3 and 4 which diagrammatically show the feed support surface 12 and the feed discharge tube 27 arranged thereabove. As previously explained, the feed discharge tube 27 is suspended in a pendulum-like manner, and the swinging movement of the discharge tube 27 is allowed for by the clearance 28 defined between the inner surface of the ring member 18 and the outer surface of the discharge tube 27. Animals, such as pigs, being fed by means of the feeding device stand around the feed discharge tube 27 and eat dry feed 29, which flows out through the space defined between the lower edge portion 17 of the feed discharge tube 27 and the feed support surface 12. When eating the feed or trying to get the feed 29, the animals will inevitably push the lower end of the discharge tube 27 from the various sides. As the feed discharge tube 27 and possibly also the feed reservoir 16 or 26 are suspended in a pendulum-like manner, even a relatively small force F (FIG. 3) applied to the lower end of the discharge tube 27 at right angles to the axis of the tube may cause a limited displacement d1 of the lower end of the discharge tube 27 in relation to its mutual central position as indicated by dotted lines in FIG. 3. This maximum swinging displacement d1 is determined by the clearance 28. This means that even piglets 30 or other small animals may move the lower part of the feed discharge tube 27 a certain distance d1 in all directions from its neutral or central position, whereby the piglets may obtain the feed they need. In the embodiment shown in FIG. 1 a relatively rigid mounting of the upper tube end as mentioned above will secure that the feed discharge tube returns to its neutral or central position each time the lower end thereof has been pushed.

When the piglets or animals grow they need more feed and consequently an increased feed discharge rate, but they also become stronger. As previously explained, at least the lower length 31 of the feed discharge tube 27 extending downwardly from the ring member 18 is elastically flexible to a certain extent. Therefore, when the piglet has grown up and become a pig or hog 32 it may apply a relatively high force P (FIG. 4) to the lower end of the discharge tube 27 and thereby move it not only the distance d1 to the position indicated in dotted lines, but further move the lower tube end by a distance d2 by elastically flexing the lower tube length 31 as illustrated by dot and dash lines in FIG. 4. Thereby, the feed supply rate of the feeding device or feeding apparatus is automatically adapted to the size and strength of the animals being fed.

The pigs or animals may push the feed 27 discharged from the support surface 12 into the troughs 11 where they may mix the dry feed with water or liquid feed by operating the liquid nipples 23, or they may operate the nipple and drink the liquid separately. Vibrations from the transverse movements of the lower end of the discharge tube 27 are transmitted also to the upper part of the tubular reservoir 16 or to the funnel-shaped reservoir shown in FIG. 2, whereby clogging of feed within the reservoir is prevented or counteracted.

EXAMPLE

In a feeding device as that shown in FIG. 1 the tube 16 has a total length of 1990 mm, an outer diameter of 110 mm and an inner diameter of 102 mm. The ring member 18 is arranged 670 mm from the lower edge portion 17 of the tube 16, and the inner diameter of the ring member 18 is 114 mm so that the lower edge 17 of the tube 16 may be moved a radial distance d1, which is approximately 2.5 mm in all directions. The vertical spacing between the lower edge portion 17 of the tube 16 and the feed support surface 12 is 10–15 mm depending on the type of the feed, which may for example be ground corn or a similar ground mixture containing fat or molasses. The tube 16 is made from a transparent polyvinyl chloride having such elastic characteristics that the lower edge portion 17 of the tube 16 may be elastically flexed a radial distance d2 of about 1 mm when a force P of 1 kg is applied to the lower end of the feed discharge tube 27 in a direction at right angles to the longitudinal axis of the discharge tube.

It should be understood that various amendments and modifications of the feeding device described above could be made within the scope of the present invention. As an example, the outer surface of the lower end of the feed discharge tube 27 could be provided with projections or other irregularities which could be activated by the pigs or animals attempting to obtain feed from the reservoir.

I claim:

1. A feeding device for feeding animals, said device comprising:
   a base member defining a feed support surface,
   a feed reservoir,
   a feed discharge tube communicating with the reservoir and extending downwardly therefrom, a lower end of the feed discharge tube being positioned above and closely spaced from the feed support surface and defining a free tube end providing feed discharge opening facing the feed support surface, the feed discharge tube being moveable relative to the base member and transversely to a longitudinal axis of the discharge tube by animals being fed,
   restriction means for cooperating with the feed discharge tube at a position above the feed support surface so as to restrict transverse movement of the feed discharge tube to a predetermined value at said position from which a lower length of the feed discharge tube depends, so as to allow an initial transverse movement of the lower end of the discharge tube in relation to the base member, and
   the lower length of the feed discharge tube is elastically flexible such that it may be flexed by at least some of the animals which may be fed by means of the feeding device, whereby due to a force being applied in a transverse direction, the lower end of the feed discharge tube may be moved further relative to the base member.

2. A feeding device according to claim 1, wherein the flexibility of the lower length of the feed discharge tube is such that a force of P kg applied to the lower free end of the feed discharge tube at right angles to the longitudinal axis thereof causes a further movement of the free tube end in the range of 0.3 P–3 mm in relation to the base member (10).

3. A feeding device according to claim 2, wherein the flexibility of the lower length of the feed discharge tube is such that a force of P kg applied to the lower free end of the feed discharge tube at right angles to the longitudinal axis thereof causes a further movement of the free tube end in the range of 0.5 P–1.5 P mm in relation to the base member.

4. A feeding device according to claim 1, wherein the feed discharge tube is made from a flexible plastic material.

5. A feeding device according to claim 4, wherein the feed discharge tube is made from polyvinyl chloride.

6. A feeding device according to claim 1, wherein the feed discharge tube is made from a transparent material.

7. A feeding device according to claim 1, wherein the feed reservoir as well as the feed discharge tube communicating therewith is in the form of an integral length of a cylindrical tube.

8. A feeding device according to claim 7, wherein an upper end of said integral length of a cylindrical tube is rigidly mounted.

9. A feeding device according to claim 1, further comprising means for adjusting the spacing of the lower end of the feed discharge tube from the feed support.

10. A feeding device according to claim 1, further comprising at least one trough surface positioned immediately adjacent to and below the feed support surface.

11. A feeding device according to claim 10, wherein a pair of trough surfaces are arranged on either side of the feed support surface, the feed discharge tube being arranged in a fence extending substantially along a vertical plane dividing the trough surfaces and the feed support surface into halves.

12. A feeding device according to claim 10, further comprising means for feeding water or liquid feed to each trough surface.

* * * * *

UNITED STATES PATENT AND TRADEMARK OFFICE
CERTIFICATE OF CORRECTION

PATENT NO. : 5,447,119
DATED : September 5, 1995
INVENTOR(S) : Hans Rasmussen

It is certified that error appears in the above-indentified patent and that said Letters Patent is hereby corrected as shown below:

On the Title page, item [22] PCT Filed: January 8, 1993

Signed and Sealed this

Thirty-first Day of October 1995

Attest:

BRUCE LEHMAN

*Attesting Officer*     *Commissioner of Patents and Trademarks*